(12) United States Patent
Lim

(10) Patent No.: US 9,071,490 B2
(45) Date of Patent: Jun. 30, 2015

(54) APPARATUS AND METHOD FOR TRANSCEIVING DATA

(75) Inventor: Jong Soo Lim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 26 days.

(21) Appl. No.: 13/988,432

(22) PCT Filed: Nov. 16, 2011

(86) PCT No.: PCT/KR2011/008758
§ 371 (c)(1),
(2), (4) Date: May 20, 2013

(87) PCT Pub. No.: WO2012/067424
PCT Pub. Date: May 24, 2012

(65) Prior Publication Data
US 2013/0259161 A1    Oct. 3, 2013

(30) Foreign Application Priority Data

Nov. 19, 2010  (KR) .................. 10-2010-0115647
Nov. 10, 2011  (KR) .................. 10-2011-0117005

(51) Int. Cl.
| H03C 3/00 | (2006.01) |
| H03K 7/06 | (2006.01) |
| H04L 27/12 | (2006.01) |
| H04L 27/26 | (2006.01) |

(52) U.S. Cl.
CPC .......... *H04L 27/262* (2013.01); *H04L 27/2624* (2013.01)

(58) Field of Classification Search
CPC ............ H04L 27/2614; H04L 27/2621; H04L 27/2624; H04L 27/2634
USPC .................. 375/271, 302, 322, 346, 345
See application file for complete search history.

(56) References Cited

U.S. PATENT DOCUMENTS

| 7,675,982 | B2* | 3/2010 | Zhang et al. | 375/260 |
| 2004/0086027 | A1* | 5/2004 | Shattil | 375/146 |
| 2005/0265469 | A1* | 12/2005 | Aldana et al. | 375/260 |
| 2007/0121483 | A1* | 5/2007 | Zhang et al. | 370/208 |
| 2007/0217490 | A1* | 9/2007 | Blake et al. | 375/222 |
| 2007/0253498 | A1* | 11/2007 | Matsumoto et al. | 375/260 |
| 2008/0260055 | A1* | 10/2008 | Kim et al. | 375/260 |
| 2010/0208837 | A1* | 8/2010 | Vetter et al. | 375/267 |
| 2010/0303180 | A1* | 12/2010 | Xiong | 375/345 |

FOREIGN PATENT DOCUMENTS

| KR | 1020080010069 A | 1/2008 |
| WO | 2010018983 A2 | 2/2010 |

* cited by examiner

*Primary Examiner* — Shuwang Liu
*Assistant Examiner* — Sung Ahn
(74) *Attorney, Agent, or Firm* — H.C. Park & Associates, PLC

(57) ABSTRACT

A data transmitting apparatus generates a plurality of pilot signals to be used for channel estimation by a data receiving apparatus, performs symbol mapping of a plurality of input data signals and a plurality of pilot signal into a plurality of data symbols and a plurality of pilot symbols, converts input symbols in the frequency domain including the plurality of data symbols and the plurality of pilot symbols into a real signal in the time domain, and performs angle modulation of the real signal. The data transmitting apparatus controls the amplitude of the sine component of the angle-modulated real signal by a gain that varies with a control signal and then transmits the real signal.

17 Claims, 18 Drawing Sheets

APPARATUS AND METHOD FOR TRANSCEIVING DATA

TECHNICAL FIELD

The present invention relates to a data transmitting/receiving method and apparatus, and more particularly, to a data transmitting/receiving method and apparatus for controlling peak-to-average power ratio (PAPR) in a communication system that transmits data using an orthogonal frequency division multiplexing (OFDM) scheme.

BACKGROUND ART

Orthogonal frequency division multiplexing (OFDM) can be implemented by a simple equalizer and is robust against multipath fading. Thus, OFDM is employed for many wireless data communication systems such as a wireless local area network (WLAN), a wireless metropolitan area network (WMAN), digital audio broadcasting (DAB), digital video broadcasting (DVB), and the like.

However, OFDM has a high peak-to-average power ratio (PAPR) of up to 12 dB by the sum of signals having the same phase because it uses multiple carriers. Also, the operating point of a power amplifier of an OFDM transmitter is located in a nonlinear region due to high PAPR, and this results in nonlinear distortion of the signals. Hence, the OFDM system backs off the power amplifier in order to reduce the effects of the PAPR. Unless the power amplifier is sufficiently backed off, the frequency spectrum of the system is widened, and cross-frequency modulation causes distortion, resulting in degradation of system performance. Therefore, it is necessary to reduce the PARR to achieve the power efficiency of the OFDM transmitter and miniaturize the OFDM transmitter.

The use of a combination of the OFDM scheme having a high PAPR of up to 12 dB with a phase modulation (PM) scheme or frequency modulation (FM) scheme can reduce the PAPR to 0 dB.

A combination of the OFDM scheme and an analog PM or FM scheme causes degradation in reception performance in a channel with multiple paths, and the FM scheme requires a broad frequency band and shows more significant degradation in reception performance than the PM scheme.

While visible light communication (VLC) using OFDM becomes efficient when PAPR is reduced to 0 dB, light communication using light (e.g., infrared light) other than illumination requires a high PAPR to improve reception performance. Accordingly, undifferentiated PAPR control causes degradation in system performance.

DISCLOSURE

Technical Problem

The present invention has been made in an effort to provide a data transmitting/receiving apparatus and method which can reduce a PAPR in a system transmitting data using an OFDM scheme and ensure stable reception performance in a multipath channel.

Technical Solution

An exemplary embodiment of the present invention provides a data transmitting apparatus. The data transmitting apparatus includes a pilot generator, a symbol mapper, a real signal converter, an angle modulation unit, a PAPR control & power normalization unit, and a signal transmitter. The pilot generator generates at least one pilot signal to be used for channel estimation by a data receiving apparatus. The symbol mapper performs symbol mapping of a plurality of data signals and at least one pilot signal into a plurality of data symbols and at least one pilot symbol. The real signal converter converts input symbols in the frequency domain including the plurality of data symbols and the at least one pilot symbol into a real signal in the time domain. The angle modulation unit performs angle modulation of the real signal. The PAPR control & power normalization unit adjusts the amplitude of the sine component of the angle-modulated real signal in accordance with a first gain, and varies the first gain in accordance with an input signal. The signal transmitter converts the amplitude-adjusted real signal into a radio frequency signal and transmits the same.

The data transmitting apparatus further includes a symbol arrangement unit, wherein the symbol arrangement unit configures pilot symbols respectively corresponding to a plurality of data symbol groups each including at least one data symbol, generates two symbols by using one data symbol of each of the data symbol groups and a pilot symbol, arranges the two symbols in the data symbol group, and outputs the two symbols to the real signal converter.

The symbol arrangement unit may generate one of the two symbols by adding the data symbol and the pilot symbol, and generate the other of the two symbols by subtracting the data symbol and the pilot symbol.

The angle modulation unit may include: a phase controller for controlling the amplitude of the real signal in accordance with a second gain; and a modulator for performing angle modulation of the real signal into a cosine signal and a sine signal.

The real signal converter may include: a normalization unit for normalizing the input symbols so that the average power of the input symbols is 1; an inverse fast Fourier transform unit for performing inverse fast Fourier transform on a plurality of input signals; and an input signal processor for inputting the input symbols and complex conjugates of the input symbols into the inverse fast Fourier transform unit.

The PAPR control & power normalization unit may include: a PAPR controller for controlling the size of the sine component of the angle-modulated real signal in accordance with the first gain; a first multiplier for multiplying the cosine component of the real signal by a set value for normalization and generating a baseband I signal; and a second multiplier for multiplying the sine component of the real signal whose amplitude is controlled in accordance with the first gain by the set value and generating a baseband Q signal, wherein if the first gain is 1, the PAPR is 0.

Another exemplary embodiment of the present invention provides a data receiving apparatus. The data receiving apparatus includes a power compensator, an angle demodulation unit, a normalization and real signal de-converter, a pilot extractor, a channel estimator, a channel equalizer, and a symbol demapper. The power compensator compensates for an adjustment in the amplitude of a baseband signal corresponding to reception data, the adjustment being made by the data receiving apparatus to achieve PAPR control. The angle demodulation unit performs angle demodulation of the baseband signal whose amplitude has been compensated for. The normalization and real signal de-converter converts the angle-modulated signal from the time domain into a plurality of parallel symbols in the frequency domain by inverse fast Fourier transform. The pilot extractor extracts a pilot symbol and data symbols from the parallel symbols. The channel estimator performs channel estimation by using the pilot symbol. The channel equalizer performs channel compensation by using an estimated channel. The symbol demapper performs symbol demapping of the data symbols into a plurality of data signals, thereby restoring data.

The angle demodulation unit may include: a phase estimator for calculating a phase estimate of the baseband signal; and a phase compensator for compensating for the phase of the baseband signal from the phase estimate.

The phase calculator may obtain the average of the phase of the baseband signal and calculate the phase estimate by the inverse tangent of the average.

The phase estimator may filter the baseband signal and calculate the phase estimate by the inverse tangent.

The pilot extractor may acquire location information of two symbols generated by the data receiving apparatus by using a pilot symbol from the parallel symbols, and extract a pilot symbol and a data symbol by using the two symbols corresponding to the location information.

The power compensator may include: two multipliers for compensating for the amplitudes of the I and Q signals of the baseband signal, respectively; and a PAPR controller for dividing the Q signal whose amplitude has been compensated for by a gain and outputting the resulting value, wherein the gain is varied.

The real signal de-converter may include: an inverse fast Fourier transform unit for performing inverse fast Fourier transform on a plurality of input signals into the parallel symbols; a serial-to-parallel converter for converting the angle-demodulated baseband signals from serial signals to parallel signals; and a signal processor for outputting part of the parallel symbols to the demapper.

Still another exemplary embodiment of the present invention provides a data transmitting method of a data transmitting apparatus. The data transmitting method includes: generating a plurality of pilot signals to be used for channel estimation by a data transmitting apparatus; performing symbol mapping of a plurality of input signals and the plurality of pilot signals to generate a plurality of data symbols and a plurality of pilot symbols; converting input symbols in the frequency domain including the plurality of data symbols and the plurality of pilot symbols from the frequency domain into a real signal in the time domain; performing angle modulation of the real signal; controlling the amplitude of the sine component of the angle-modulated real signal; and converting the angle-modulated real signal into a radio frequency signal and transmitting the same.

The generating of a plurality of pilot signals may include: configuring pilot symbols respectively corresponding to a plurality of data symbol groups each including at least one data symbol; generating two symbols by using one data symbol of each of the data symbol groups and a pilot symbol; and arranging the two symbols in the data symbol group.

The controlling may include varying the gain in accordance with an input control signal.

Yet another exemplary embodiment provides a data receiving method of a data receiving apparatus. The data receiving method includes: compensating for the amplitude of a baseband signal corresponding to reception data; performing angle demodulation of the baseband signal; converting the angle-modulated signal from the time domain into a plurality of parallel symbols in the frequency domain by inverse fast Fourier transform; extracting a pilot symbol and data symbols from the parallel symbols; compensating for an estimated channel by using the pilot symbol; and performing symbol demapping of the data symbols to restore the reception data.

The performing of angle demodulation may include: estimating the phase of the baseband signal; and compensating for the phase of the baseband signal by using a phase estimate.

The extracting may include: acquiring location information of two symbols generated using a pilot symbol by the data transmitting apparatus; and extracting a pilot symbol and data symbols by using the two symbols corresponding to the location information.

MODE FOR INVENTION

Figure 1:
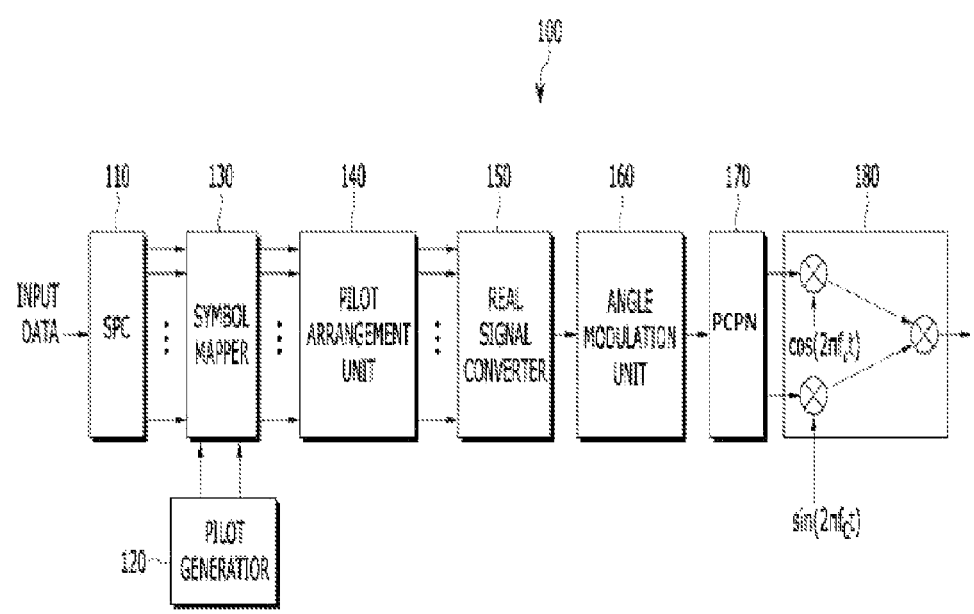
FIG. 1 is a view showing an OFDM transmitting apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising" will be understood to imply the inclusion of stated elements but not the exclusion of any other elements.

Now, a data transmitting/receiving apparatus and method according to an exemplary embodiment of the present invention will be described in detail with reference to the drawings.

Figure 2:
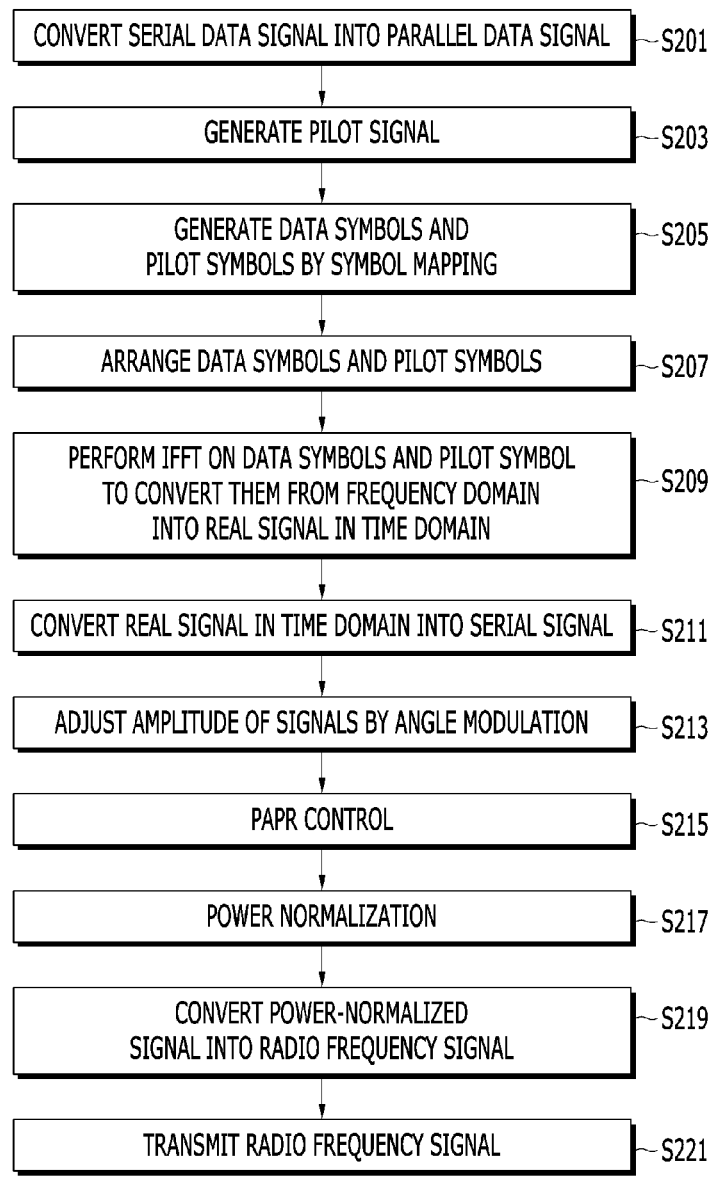
FIG. 2 is a flowchart showing an OFDM transmitting apparatus according to an exemplary embodiment of the present invention.

FIG. 1 is a view showing an OFDM transmitting apparatus according to an exemplary embodiment of the present invention, and FIG. 2 is a flowchart showing an OFDM transmitting apparatus according to an exemplary embodiment of the present invention.

Referring to FIG. 1, the OFDM transmitting apparatus 100 includes a serial-to-parallel converter (SPC) 110, a pilot generator 120, a symbol mapper 130, a pilot arrangement unit 140, a real signal converter 150, an angle modulation unit 160, a PAPR control & power normalization unit (PCPN) 170, and a signal transmitter 180.

Referring to FIG. 2, upon receiving a plurality of serial data signals corresponding to input data in bits, the SPC 110 converts the plurality of serial data signals into a plurality of parallel data signals (S201).

The pilot generator 120 generates at least one pilot signal to be used for channel estimation and channel equalization in an OFDM receiving apparatus (S203).

The symbol mapper 130 performs symbol mapping of the plurality of parallel data signals and the at least one pilot signal by digital modulation such as binary phase shift keying (BPSK), quadrature amplitude modulation (qAM), 16-QAM, and 64-QAM (S205).

The pilot arrangement unit 140 arranges at least one pilot symbol and a plurality of data symbols to facilitate channel estimation (S207).

The real signal converter 150 performs inverse fast Fourier transform (IFFT) on the at least one pilot symbol and the plurality of data symbols to transform them from the frequency domain into a real signal in the time domain (S209). The normalizing and real signal converter (NRSC) 150 may convert the real signal in the time domain into a serial signal (S211).

The angle modulation unit 160 performs angle modulation of the real signal to adjust the amplitude of the real signal (S213). The angle modulation may include a phase modulation (PM) scheme.

The PCPN 170 adjusts the amplitude of the sine component of the angle-modulated real signal in accordance with a gain to control PAPR (S215) and normalize the power of the signal (S217).

Next, the signal transmitter 180 multiplies the real component of the power-normalized signal by A, multiplies the imaginary component of the power-normalized signal by B, and adds the two components to convert the power-normalized signal into a radio frequency signal (S219). A may be $\cos(2\pi f_c t)$ or $\sin(2\pi f_c t)$ and B may be $\cos(2\pi f_c t)$ or $\sin(2\pi f_c t)$, which may be different from A. $f_c$ is radio frequency. FIG. 1 has illustrated that A is $\cos(2\pi f_c t)$ and B is $\sin(2\pi f_c t)$. Alternatively, the signal transmitter 180 may multiply the imaginary component of the power-normalized signal by −B.

The signal transmitter 160 transmits a radio frequency signal (S221). The radio frequency signal transmitted by the OFDM transmitting apparatus 100 may be defined as an OFDM signal.

Now, the OFDM transmitting apparatus 100 will be described in detail with reference to FIGS. 3 to 9.

Figure 3:
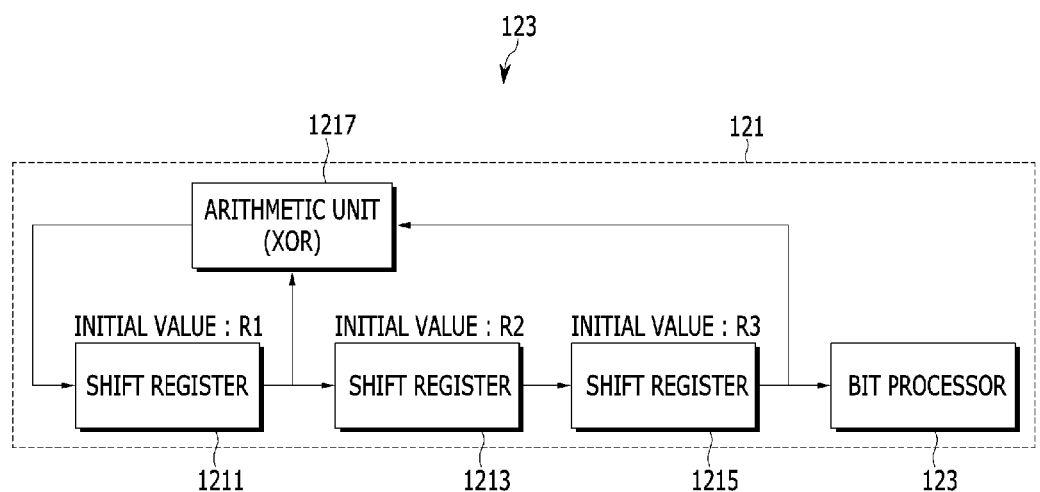
FIG. 3 is a view showing an example of the pilot generator shown in FIG. 1.
Figure 4:
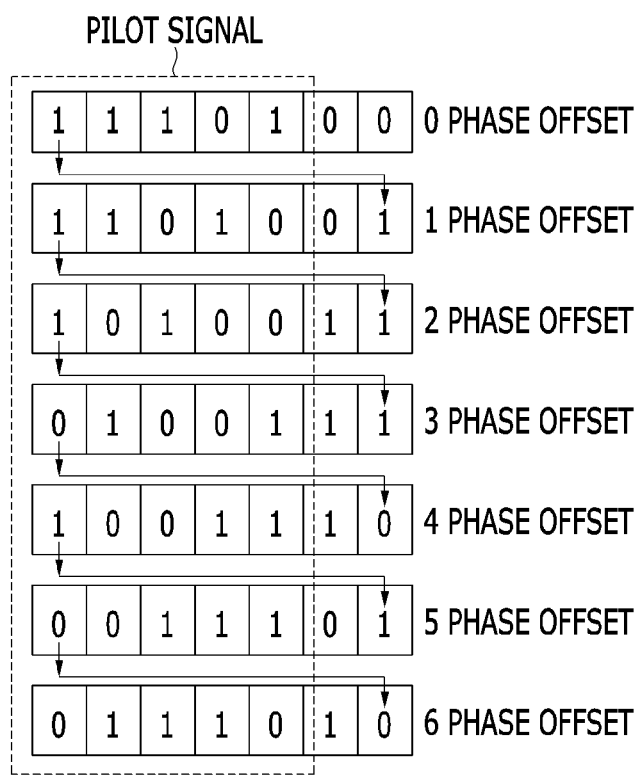
FIG. 4 is a view showing an example of a pilot signal generation method.

FIG. 3 is a view showing an example of the pilot generator shown in FIG. 1, and FIG. 4 is a view showing an example of a pilot signal generation method.

The pilot generator 120 may use a pseudorandom noise (PN) code, which exhibits noise characteristics similar to those of a random sequence and can be reproduced, to generate a pilot signal. In this case, as shown in FIG. 3, the pilot generator 120 may include a PN code generator consisting of shift registers 1211, 1213, and 1215, an arithmetic unit 1217, and a bit processor 123. Otherwise, the pilot generator 120 may be used to receive a PN code generated from the PN code generator and generate a pilot signal.

The shift registers 1211, 1213, and 1215 shift input signals. The arithmetic unit 127 performs an exclusive-or (XOR) operation of two input signals. If the two input signals have the same number of bits, the arithmetic unit 127 outputs 0, and if the two input signals have a different number of bits, it outputs 1.

The bit processor 123 selects a pilot signal in a PN code.

For example, if it is assumed that the initial values R1, R2, and R3 of the shift registers 121, 123, and 125 are (1, 1, 1), the repetition cycle is 7 ($=2^m-1$), and a PN code output from the PN code generator 121 is "1 1 1 0 1 0 0". Here, m is the number of shift registers. If the number of pilot signals is 5, five bits, i.e., "1 1 1 0 1" are selected from the PN code "1 1 1 0 1 0 0", and "1 1 1 0 1" are respectively configured as pilot signals.

The bit processor 123 may shift (phase offset) the PN code by 1 bit to identify a base station to generate a plurality of PN codes for base station identification. For instance, if the PN code is "1 1 1 0 1 0 0", seven PN codes may be generated as in FIG. 4, and as many bits as the number of pilots are selected from each PN code, and respectively set as pilot signals.

Figure 5:
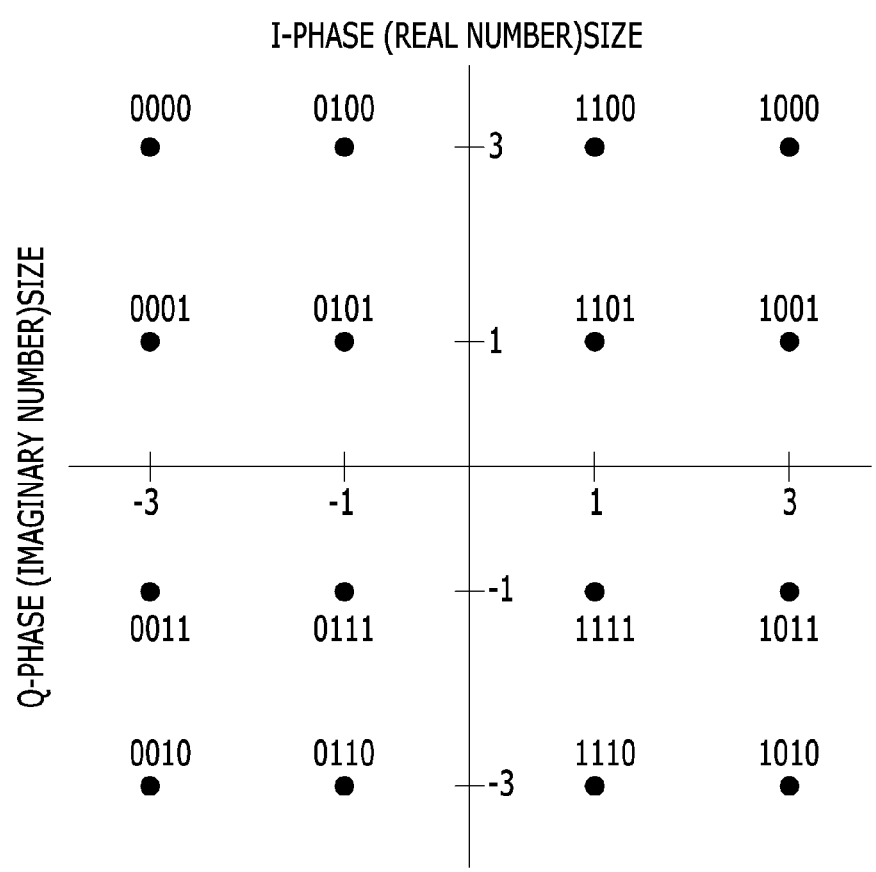
FIG. 5 is a view showing an example of symbols mapped by the symbol mapper of FIG. 1.
Figure 6:
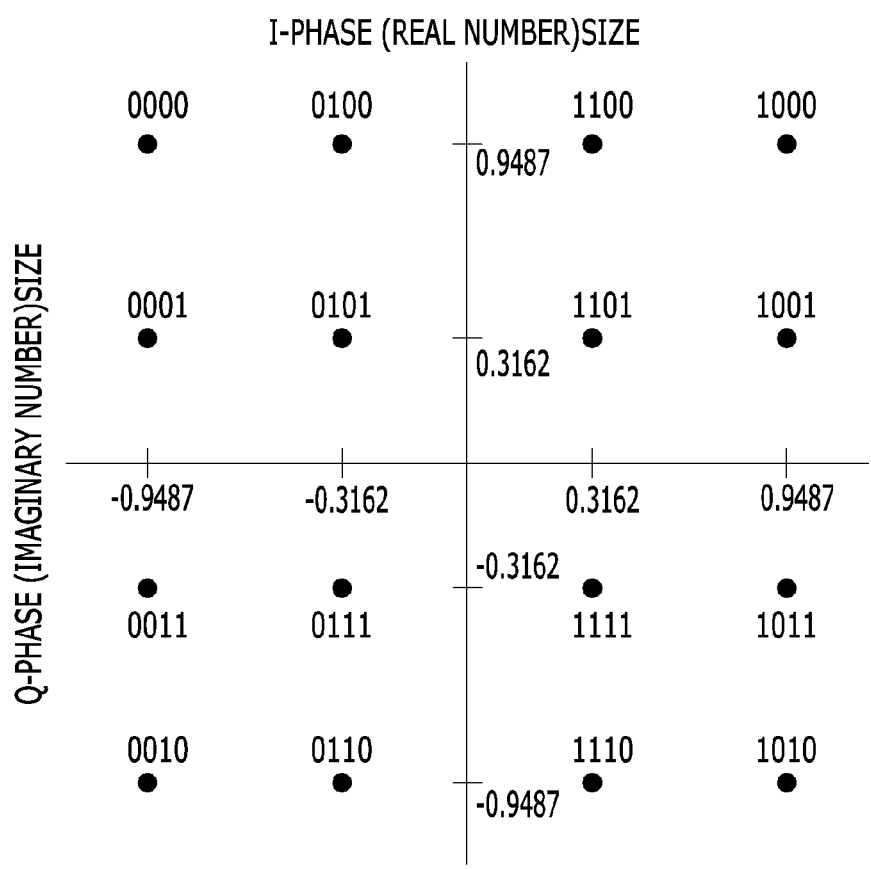
FIG. 6 is a view showing an example of symbols normalized by the symbol mapper of FIG. 1.

FIG. 5 is a view showing an example of symbols mapped by the symbol mapper of FIG. 1, and FIG. 6 is a view showing an example of symbols normalized by the symbol mapper of FIG. 1.

The symbol mapper 130 maps a plurality of parallel data signals and at least one pilot signal symbol to data symbols representing positions on a signal constellation according to a modulation scheme, such as BPSK, QAM, 16-QAM, and 64-QAM. The mapped data symbols and pilot symbols are as shown in FIG. 5. That is, the mapped symbols are complex signals.

Moreover, the symbol mapper 130 normalizes the data symbols and the pilot symbols. The symbol mapper 130 can normalize the data symbols and the pilot symbols so that average power becomes 1 by taking absolute values of input symbols, squaring the absolute values to calculate an average value, calculating the square root of the obtained average value, and then dividing the input symbols by the square root. For instance, if the symbols mapped by the symbol mapper 130 are as shown in FIG. 5, the average value becomes 10

$$\left( = \frac{2 \times 2}{4} \sum [1^2 + 3^2] = 10 \right)$$

and the input symbols can be normalized by multiplying the input symbols by $1/\sqrt{10}$, and the normalized symbols are shown as in FIG. 6.

Figure 7:
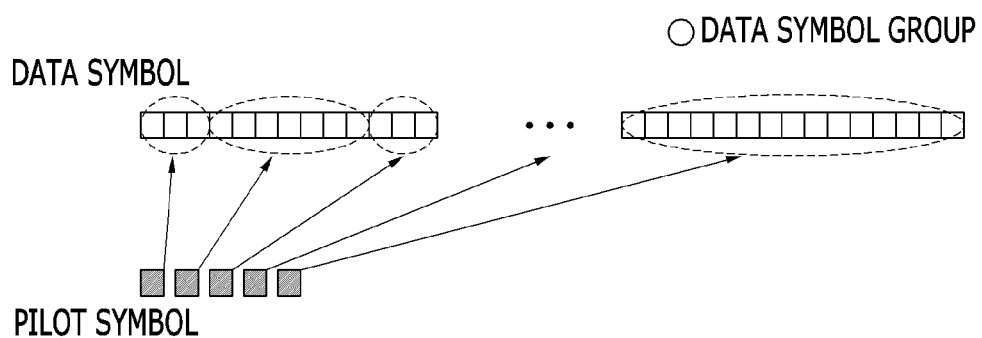
FIG. 7 is a view showing an example of a data symbol grouping method performed by the pilot arrangement unit shown in FIG. 1.
Figure 8:
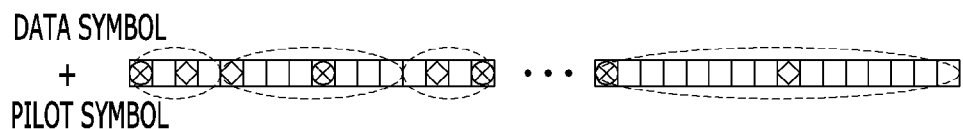
FIG. 8 is a view showing an example of a data symbol and pilot symbol arrangement method performed by the pilot arrangement unit shown in FIG. 1.

FIG. 7 is a view showing an example of a data symbol grouping method performed by the pilot arrangement unit shown in FIG. 1, and FIG. 8 is a view showing an example of a data symbol and pilot symbol arrangement method performed by the pilot arrangement unit shown in FIG. 1.

Pilot symbols are used for channel equalization of data symbols. The pilot arrangement unit 240 determines a data symbol group for performing channel equalization using each pilot symbol. The number of data symbol groups corresponds to the number of pilot symbols.

If there are five pilot symbols, the pilot arrangement unit 140 groups a plurality of data symbols into five data symbols groups. For example, as shown in FIG. 7, the pilot arrangement unit 140 may select the first three data symbols as a data symbol group for performing channel equalization using the first pilot symbol, and select the next seven data symbols as a data symbol group for performing channel equalization using the second pilot symbol. Also, the pilot arrangement unit 140 may select the last 15 data symbols as a data symbol group for performing channel equalization using the fifth pilot symbol.

Next, the pilot arrangement unit 140 selects one data symbol from each data symbol group, and generates two new data symbols by adding a pilot symbol corresponding to each data symbol group and the selected data symbol and subtracting a pilot symbol corresponding to each data symbol group and the selected data symbol. For example, if the pilot symbol is 1, and the selected data symbol is 3+j*5, a data symbol obtained by adding the pilot symbol and the selected data symbol may be equal to 4+j*5 and a data symbol obtained by subtracting the pilot symbol and the selected data symbol may be equal to −2−j*5. Otherwise, the pilot symbol may be added to or subtracted from the selected data symbol. In this case, a data symbol obtained by adding the pilot symbol and the selected data symbol may be equal to 4+j*5, and a data symbol obtained by subtracting the pilot symbol from the selected data symbol may be equal to 2+j*5.

Once two new data symbols are generated, the pilot arrangement unit 140 divides the two new data symbols by $\sqrt{2}$ for normalization, and arranges the two data symbols at certain positions of the respective groups. For example, the pilot arrangement unit 240 may arrange the two new data symbols at arbitrary positions as shown in FIG. 8. In this way, the number of data symbols in each data symbol group increases 1 by 1.

Figure 9:
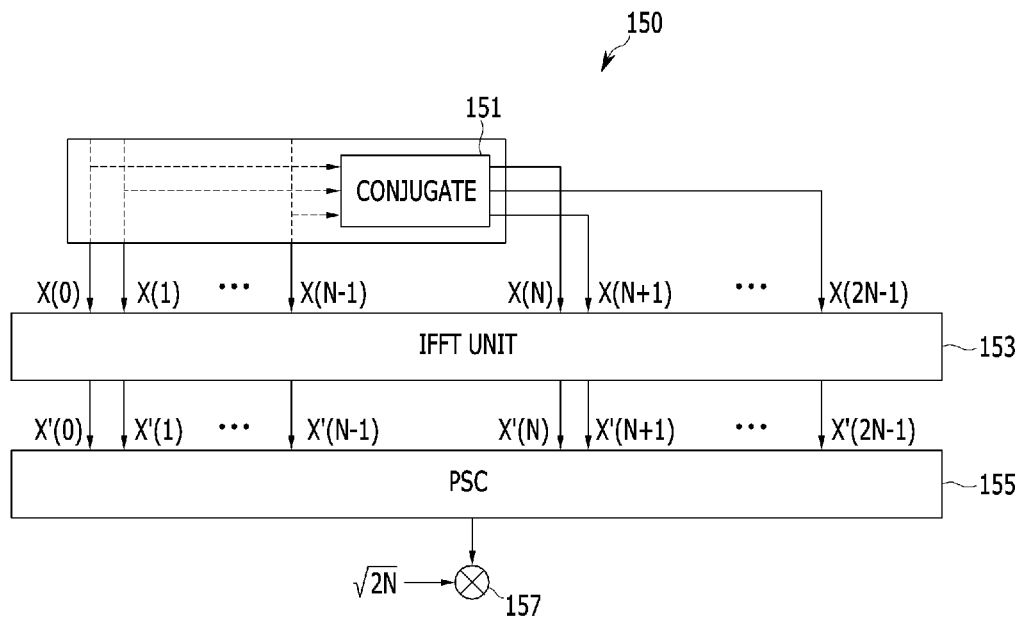
FIG. 9 is a view showing the real signal converter shown in FIG. 1.

FIG. 9 is a view showing the real signal converter shown in FIG. 1.

Referring to FIG. 9, the real signal converter 150 includes an input signal processor 151, an IFFT unit 153, a parallel-to-serial converter (PSC) 155, and a multiplier 157.

To convert input data symbols and pilot symbols from the frequency domain into real signals in the time domain, the input signal processor 151 inputs incoming data symbols and pilot symbols as input signals [X(0), X(1), X(N−1), X(N), X(N+1), ..., X(2N−1)] of the IFFT unit 153. Here, N (exponent of 2) represents the number of symbols, and if the number of symbols is N, the size of IFFT may be 2N That is, the input signal processor 151 uses N data symbols as input signals [X(0), X(1), ..., X(N−1), X(N), X(N+1), ..., X(2N−1)] of the IFFT unit 153, and uses complex conjugates of N data symbols as input signals [X(N), X(N+1), ..., X(2N−1)] of the IFFT unit 153. The 0-th data symbol is 1, and therefore data symbols input as input signals [X(0), (X(N)] are 0. That is, N data symbols may be used as the input signals [X(1), ..., X(N−1)], and complex conjugates of data symbols of input signals [X(2N−k)] may be used as an input signal [X N+1, ..., X 2N−1]. Here, k is N+1, N+2, ..., 2N−1.

When input signals [X(0), X(1), ..., X(N−1), X(N), X(N+1), ..., X(2N−1)] are input into the IFFT unit 153, the IFFT unit 153 performs IFFT of the input signals [X(0,) X(1), ..., X(N−1), X(N), X(N+1), ..., X(2N−1)]. Then, the data symbols and the pilot symbols, i.e., input symbols, are converted from the frequency domain into real signals [(X'(0), X'(1), ..., X'(N−1), X'(N), X'(N+1), ..., X'(2N−1)] in the time domain.

The PSC 155 converts the real signals in the time domain from parallel signals into serial signals.

The multiplier 157 performs normalization by multiplying the serial real signals by $\sqrt{2N}$.

Figure 10:
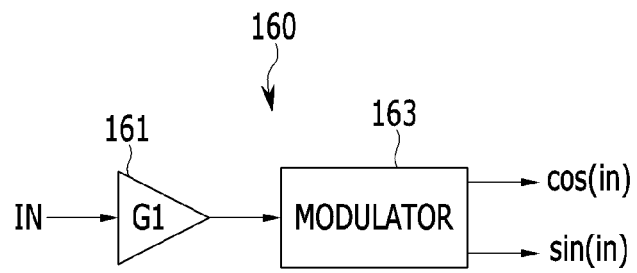
FIG. 10 is a view showing the angle modulation unit shown in FIG. 1.
Figure 11:
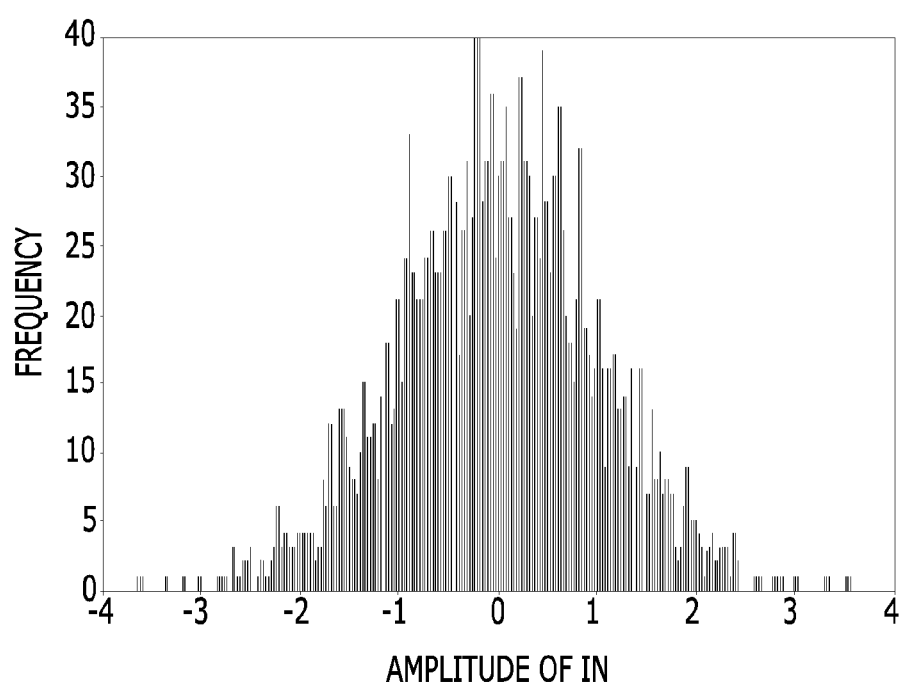
FIG. 11 is a view showing the phase amplitude distribution of an input signal from the angle modulation unit.
Figure 12:
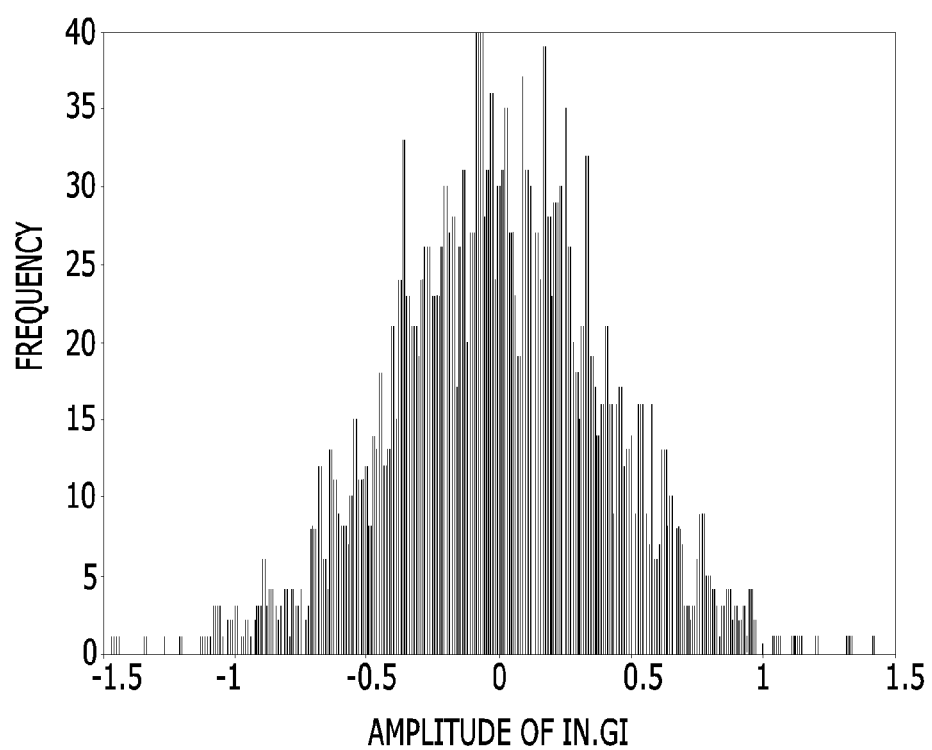
FIG. 12 is a view showing the phase amplitude distribution of an output signal from the angle modulation unit.

FIG. 10 is a view showing the angle modulation unit shown in FIG. 1, FIG. 11 is a view showing the phase amplitude distribution of an input signal from the angle modulation unit, and FIG. 12 is a view showing the phase amplitude distribution of an output signal from the angle modulation unit.

Referring to FIG. 10, the angle modulation unit 160 includes a phase controller 161 and a modulator 163.

The phase controller 161 receives a normalized real signal as an input signal IN from the real signal converter 150. The phase controller 161 adjusts the amplitude of the input signal IN by varying a gain G1 so that the amplitude of the input signal IN is within the range from $-\pi/2$ to $\pi/2$. Here, $\pi$ is pi (the ratio of the circumference of a circle to its diameter).

For example, if the phase amplitude of the input signal IN is as shown in FIG. 11, the phase controller 161 can adjust the amplitude of the input signal IN by multiplying the input signal IN by a gain of 0.4 so that the level of the input signal is within the range from $-\pi/2$ to $\pi/2$. Then, as shown in FIG. 12, the phase amplitude of the input signal IN may be within the range from $-\pi/2$ to $\pi/2$.

The modulator 163 performs angle modulation of the real signal adjusted by the phase controller 161 into a cosine signal and a sine signal [cos(IN), sin(IN)].

Figure 13:
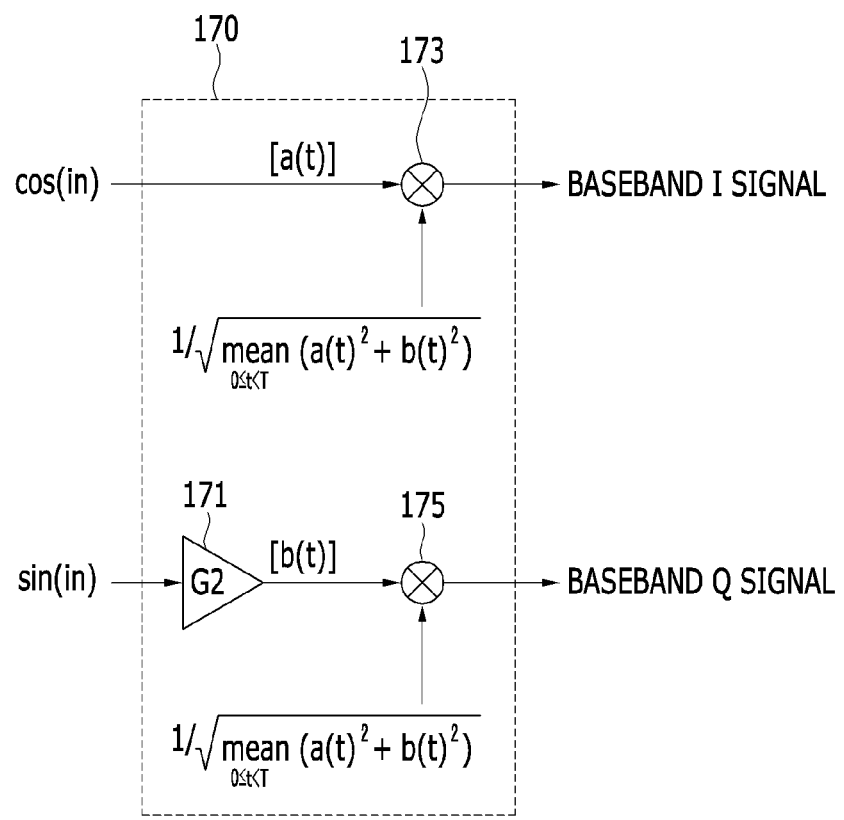
FIG. 13 is a view showing the PCPN shown in FIG. 1.

FIG. 13 is a view showing the PCPN shown in FIG. 1.

Referring to FIG. 13, the PCPN 170 includes a PAPR controller 171 and multipliers 173 and 175. The multipliers 173 and 175 may operate as a power normalization unit for power normalization.

The cosine signal [cos(IN)], which is an output signal from the modulator 163, is indicated by a(t) in FIG. 13 for convenience.

The cosine signal [a(t)], which is an output signal from the modulator 163, is input into the multiplier 173 without passing through the PAPR controller 171, and a sine signal [sin (IN)], which is an output signal from the modulator 163, is input into the PAPR controller 171.

The PAPR controller 171 controls a gain G2 in accordance with an input control signal, and adjusts the amplitude of an input sine signal [sin(IN)] in accordance with the gain G2. The control signal may include a gain value desired to be controlled.

That is, the PAPR controller 171 controls PAPR by adjusting only the amplitude of the sine component of the angle-modulated real signal. The sine signal [b(t)] adjusted by the PAPR controller 171 is input into the multiplier 175.

In general, PAPR in an OFDM symbol is expressed by Equation 1. A guard interval is inserted into a serial signal in the time domain output from the real signal converter 150, and the guard interval and a signal corresponding to one data symbol (or pilot symbol) are added to form an OFDM symbol.

$$10 \times \log\left(\frac{\max_{t\in[0,T]} |x(t)|^2}{E\{|x(t)|^2\}}\right) \quad \text{[Equation 1]}$$

Here, E{.} denotes an expected value, and T denotes the period of an OFDM symbol.

PAPR(dB) according to an exemplary embodiment of the present invention may be expressed as shown in Equation 2 and Equation 3.

$$10 \times \log\left(\frac{\max_{t\in[0,T]} (a(t)^2 + b(t)^2)}{E\{a(t)^2 + b(t)^2\}}\right) \quad \text{[Equation 2]}$$

$$10 \times \log\left(\frac{\max_{t\in[0,T]} (a(t)^2 + b(t)^2)}{E\{a(t)^2 + Gain^2 \times \sin(IN(t))^2\}}\right) \quad \text{[Equation 3]}$$

In Equation 3, Gain denotes the gain G2 of the PAPR controller 171, and when Gain becomes 1, PAPAR becomes 0 dB.

Particularly, as can be seen from Equation 3, PAPR differs according to Gain. That is, it is possible to control the gain G2 of the PAPR controller 171 by using a control signal depending on a reception environment, thereby enabling PAPR control as well.

For example, if the gain G1 of the phase controller 161 shown in FIG. 10 is 0.4, the size of the IFFT is 2048, and 16QAM modulation is used, PAPR may differ according to the gain G2 of the PAPR controller 171 as shown in Table 1.

TABLE 1

| PAPR(dB) | G2 |
|---|---|
| 0 | 1 |
| 2.8 | 1.5 |
| 4.5 | 2 |
| 5.6 | 2.5 |
| 6.3 | 3 |

The cosine signal [a(t)] and the sine signal [b(t)] whose amplitude is adjusted are multiplied by a value of C for power normalization. C is as shown in Equation 4.

$$C = 1 \Big/ \sqrt{\operatorname*{mean}_{0\le t<T}(a(t)^2 + b(t)^2)} \quad \text{[Equation 4]}$$

That is, the multiplier 173 performs power normalization by multiplying the cosine signal [a(t)] by C, and the multiplier 175 performs power normalization by multiplying the sine signal [b(t)] by C.

On the assumption that a power-normalized cosine signal is a baseband I signal and a power-normalized sine signal is a baseband Q signal, the baseband I signal and the baseband Q signal are multiplied by $\cos(2\pi f_c t)$ and $\sin(2\pi f_c t)$, respectively, and added together and converted into a radio frequency signal.

Figure 14:
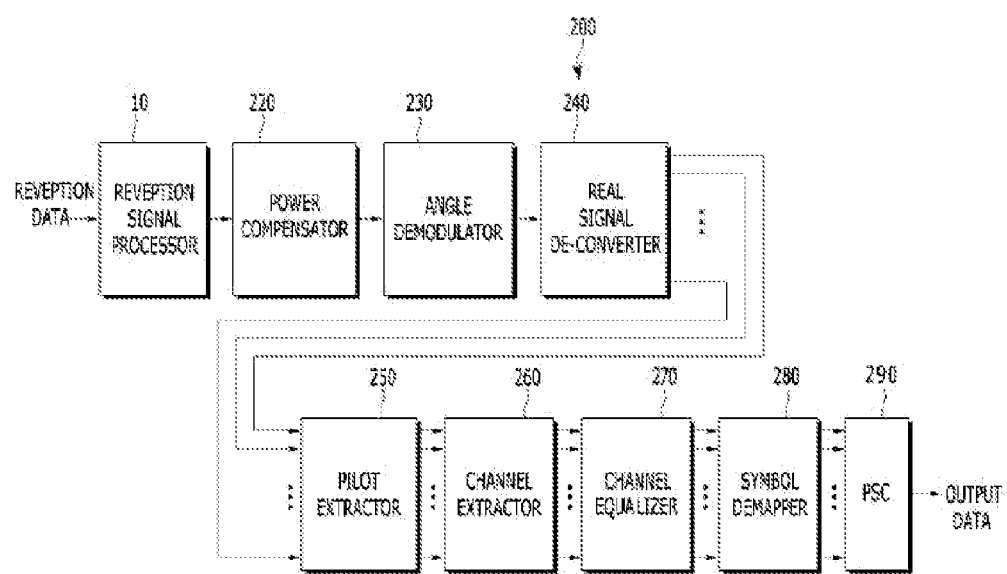
FIG. 14 is a view showing an OFDM receiving apparatus according to an exemplary embodiment of the present invention.
Figure 15:
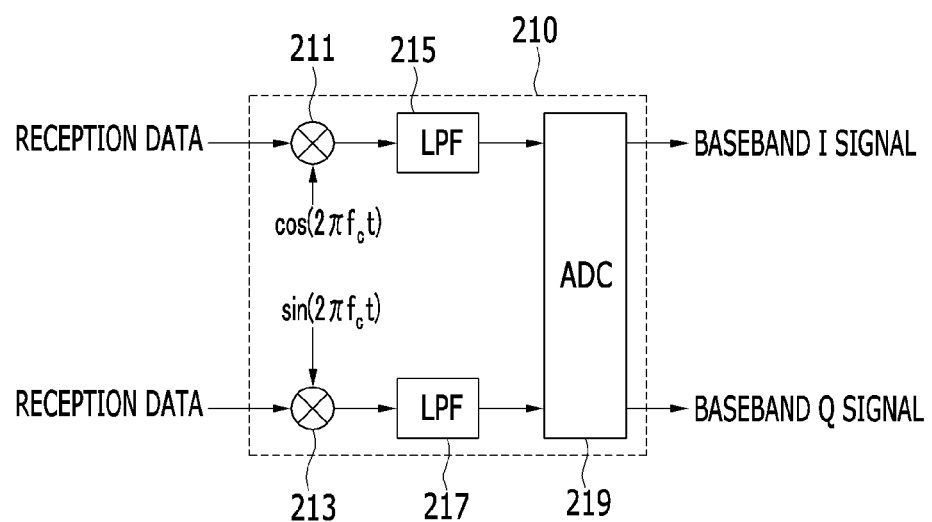
FIG. 15 is a flowchart showing a data receiving method of an OFDM receiving apparatus according to an exemplary embodiment of the present invention.

FIG. 14 is a view showing an OFDM receiving apparatus according to an exemplary embodiment of the present invention, and FIG. 15 is a flowchart showing a data receiving method of an OFDM receiving apparatus according to an exemplary embodiment of the present invention.

Referring to FIG. 14, the OFDM receiving apparatus 200 includes a reception signal processor 210, a power compensator 220, an angle demodulation unit 230, a real signal de-converter 240, a pilot extractor 250, a channel estimator 260, a channel equalizer 270, a symbol demapper 280, and a PSC 290. Such an OFDM receiving apparatus 200 performs the reverse operation of the OFDM transmitting apparatus 100.

As shown in FIG. 15, upon receiving an OFDM signal as reception data, the reception signal processor 210 multiplies a real component of the OFDM signal by A' and multiplies an imaginary component of a power-normalized signal by B', and then convert a passband analog signal into a plurality of baseband digital signals by analog-to-digital conversion (S1502). Here, A' and B' may be identical to A and B of the OFDM receiving apparatus 100, and B' may be −B. A' may be $\cos(2\pi f_c t)$ or $\sin(2\pi f_c t)$ and B' may be $\cos(2\pi f_c t)$ or $\sin(2\pi f_c t)$, which may be different from A'. $f_c$ is a radio frequency.

The power compensator 220 compensates for an adjustment in the amplitude of a plurality of baseband digital signals, the adjustment being made by the PAPR controller 171 (S1504).

The angle demodulation unit 230 performs angle demodulation of the plurality of baseband digital signals whose amplitude has been compensated for by the power compensator 220 (S1506).

The real signal de-converter 240 converts the angle-demodulated signals from serial signals into parallel signals (S1508), and performs fast Fourier transform (FFT) on the converted parallel signals to convert them from parallel signals in the time domain into parallel symbols in the frequency domain (S1510).

The pilot extractor 250 extracts pilot symbols from the parallel symbol in the frequency domain (S1512).

The channel estimator 260 performs channel estimation by using the extracted pilot symbols (S1514).

The channel equalizer 270 compensates for channel distortion by using a channel estimated from data symbols of each data symbol group (S1516).

The symbol demapper 280 generates a plurality of parallel data signals by performing symbol demapping on parallel data symbols, whose channel distortion is compensated for by the channel equalizer 270, by BPSK, QAM, 16-QAM, 64-QAM, and so on (S1518).

The PSC 290 converts a plurality of parallel data symbols output from the symbol demapper 280 into a plurality of serial data symbols and outputs them (S1520), and therefore an OFDM signal is restored into a data signal.

The OFDM receiving apparatus 200 will now be described in detail with reference to FIGS. 16 to 22.

Figure 16:
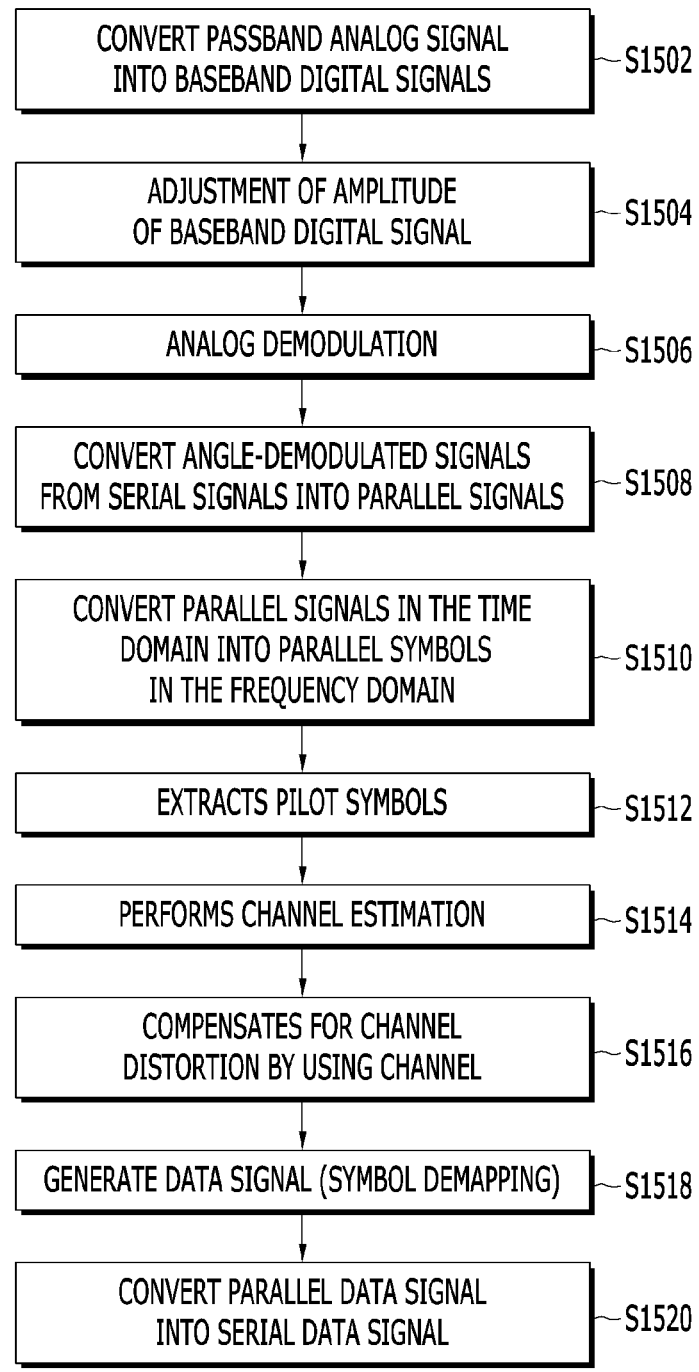
FIG. 16 is a view showing an example of the reception signal processor shown in FIG. 14.

FIG. 16 is a view showing an example of the reception signal processor shown in FIG. 14.

Referring to FIG. 16, the reception signal processor 210 includes multipliers 211 and 213, low pass filters (LPFs) 215 and 217, and an analog-to-digital converter (ADC) 219.

The multiplier 211 multiplies a received OFDM signal by A', converts the resulting value into a cosine or sine signal, and outputs it to the LPF 215. FIG. 16 illustrates that A' is $\cos(2\pi f_c t)$. In this case, a signal output from the multiplier 211 may be a cosine signal.

The multiplier 213 multiplies a received OFDM signal by B', converts the resulting value into a cosine or sine signal, and outputs it to the LPF 217. FIG. 16 illustrates that B' is $\sin(2\pi f_c t)$. A signal output from the multiplier 211 may be a sine signal.

Here, A' may be $\cos(2\pi f_c t)$ or $\sin(2\pi f_c t)$ and B' may be $\cos(2\pi f_c t)$ or $\sin(2\pi f_c t)$, which may be different from A'. The LPFs 215 and 217 filter the cosine signal and the sine signal respectively input from the multipliers 211 and 213 to pass only signals in a desired band out of input signals.

The ADC 219 converts the cosine signal and sine signal passed through the LPFs 215 and 217 into a digital baseband I signal and a digital baseband Q signal by analog-to-digital conversion, and then outputs the digital baseband I signal and the digital baseband Q signal.

Meanwhile, if the OFDM transmitting apparatus 100 multiplies a signal [cos(2πf_c t) or sin(2πf_c t)], by which the baseband Q signal is multiplied, by a negative number (−), the ADC 219 may multiply the output digital baseband Q signal by a negative number (−).

Figure 17:
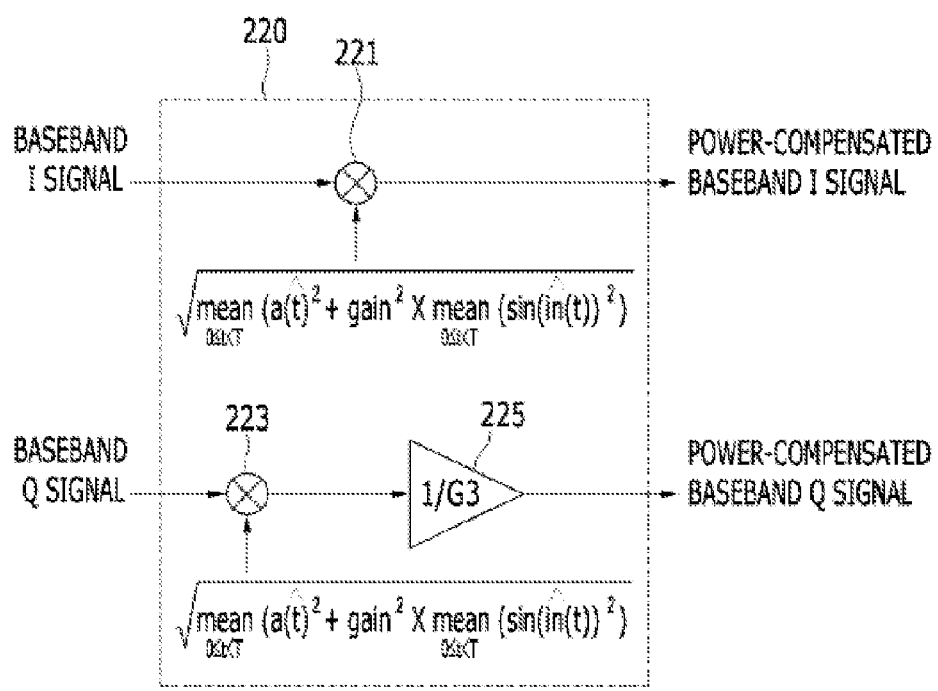
FIG. 17 is a view showing the power compensator shown in FIG. 14.

FIG. 17 is a view showing the power compensator shown in FIG. 14.

Referring to FIG. 17, the power compensator 220 includes multipliers 221 and 223 and a PAPR controller 225.

The multiplier 221 multiplies a digital baseband I signal output from the reception signal processor 210 by D to compensate for the power of the baseband I signal and output the power-compensated signal.

The multiplier 223 multiplies a digital baseband Q signal output from the reception signal processor 210 by D to perform power compensation and output the power-compensated signal to the PAPR controller 225.

Here, D can be expressed by Equation 5.

$$D = \sqrt{\underset{0 \leq t < T}{mean}\left(a(\hat{t})^2\right) + Gain^2 \times \underset{0 \leq t < T}{mean}(\sin(\widehat{IN(t)})^2)} \quad \text{[Equation 5]}$$

Here, T indicates the period of an OFDM symbol. $a(\hat{t})$ indicates an estimate of a cosine signal [a(t) of FIG. 13] from the OFDM transmitting apparatus 100, and $\sin(\widehat{IN(t)})$ indicates an estimate of a sine signal I[ sin(IN(t)) of FIG. 13] from the OFDM transmitting apparatus 100. Gain indicates the gain G1 of the phase controller (161 of FIG. 10).

$$\underset{0 \leq t < T}{mean}(a(\hat{t})^2)$$

and $$\underset{0 \leq t < T}{mean}(\sin(\widehat{IN(t)})^2)$$

cannot be accurately obtained because the signal of the IFFT is a random signal. Accordingly, errors can be reduced by repeated averaging operations, and an estimate according to the gain G1 of the phase controller (161 of FIG. 10) of the OFDM transmitting apparatus 100 is as shown in Table 2.

TABLE 2

| G1 | $\underset{0 \leq t < T}{mean}(a(\hat{t})^2)$ | $\underset{0 \leq t < T}{mean}(\sin(\widehat{IN(t)})^2)$ |
|---|---|---|
| 0.5 | 0.81 | 0.19 |
| 0.45 | 0.84 | 0.16 |
| 0.4 | 0.87 | 0.13 |
| 0.35 | 0.9 | 0.1 |
| 0.3 | 0.92 | 0.08 |

The PAPR controller 225 divides a signal whose power is compensated by the multiplier 221 by a gain G3 of the PAPR controller 223 and outputs a baseband Q signal. The gain G3 of the PAPR controller 225 is identical to the gain G2 of the PAPR controller 171. For example, if the gain G1 of the phase controller (161 of FIG. 10) is 0.4 and the gain G3 of the PAPR controller 225 is 2, D is equal to 1.179. A value obtained by multiplying the baseband Q signal by 1.179 is divided by 2, and a power-compensated baseband Q signal is generated.

Figure 18:
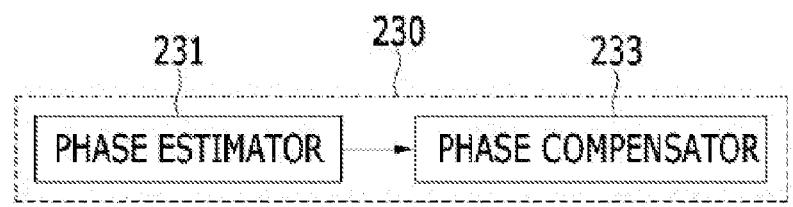
FIG. 18 is a view showing the angle demodulation unit shown in FIG. 10
Figure 19:
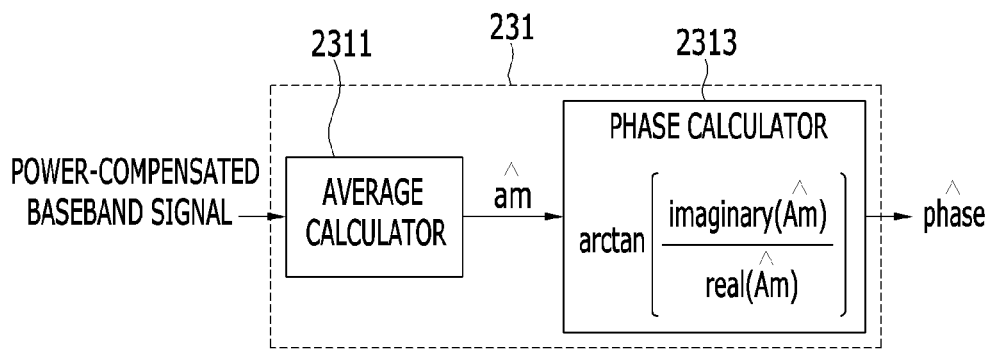
FIGS. 19 and 20 are views showing the phase estimator shown in FIG. 18.
Figure 20:
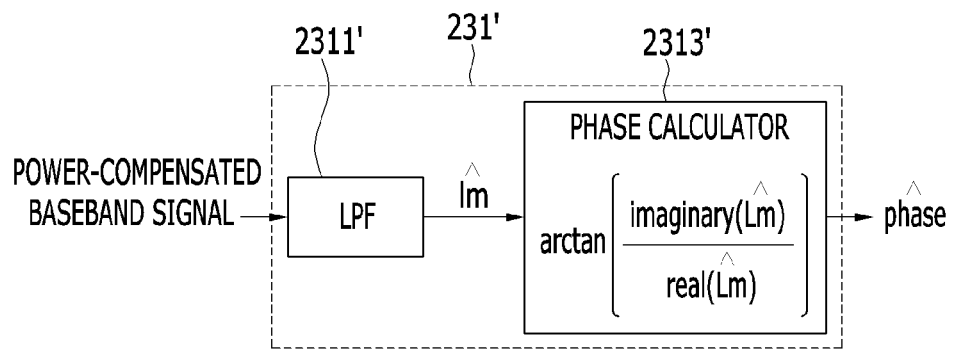
Figure 21:
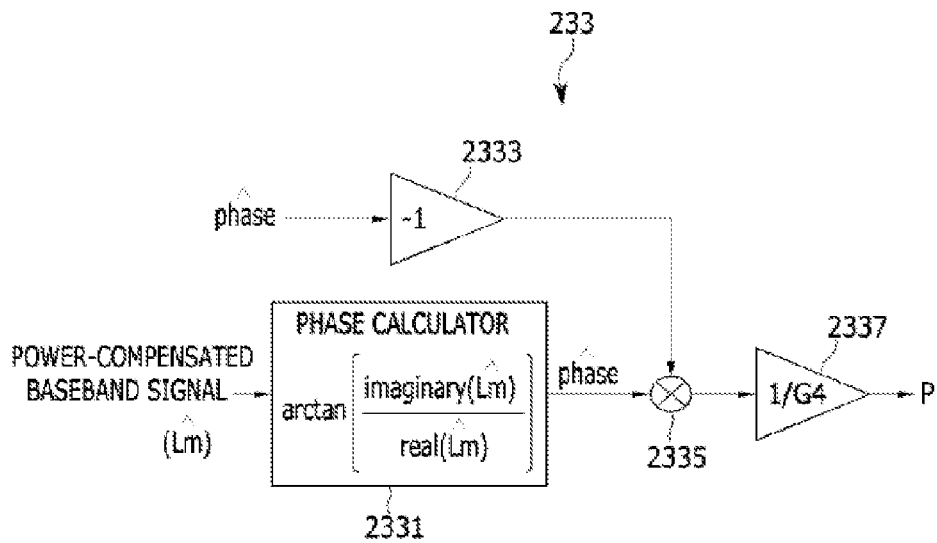
FIG. 21 is a view showing the phase compensator shown in FIG. 18.

FIG. 18 is a view showing the angle demodulation unit shown in FIG. 14, FIGS. 19 and 20 are views showing a phase estimator shown in FIG. 18, and FIG. 21 is a view showing a phase compensator shown in FIG. 18.

Referring to FIG. 18, the angle modulation unit 230 includes the phase estimator 231 and the phase compensator 233.

The phase estimator 231 performs phase estimation in order to compensate for phase distortion.

As shown in FIG. 19, the phase estimator 231 includes an average calculator 2311 and a phase calculator 2313.

The average calculator 2311 calculates the average ($\hat{Am}$) of input baseband signals. For instance, if the size of IFFT is N, the average ($\hat{Am}$) can be calculated by adding the phases of N input baseband signals and dividing the resulting value by N.

The phase calculator 2313 calculates a phase estimate ($\hat{Am}$) by the inverse tangent (arctan) of the average ($\hat{Am}$). As shown in Equation. 6, $\hat{phase}$ can be calculated by the inverse tangent of a value obtained by dividing an imaginary component of the average ($\hat{Am}$) by a real component of the average ($\hat{Am}$).

$$\hat{phase} = \arctan\left(\frac{\text{imaginary}(\hat{Am})}{\text{real}(\hat{Am})}\right) \quad \text{[Equation 6]}$$

A phase estimate ($\hat{phase}$) can be obtained by methods other than the above method using the average ($\hat{Am}$) of baseband signals.

Referring to FIG. 20, a phase estimator 231' may include an LPF 2311' and a phase calculator 2313'.

The LPF 2311' filters an input baseband signal and outputs a low band signal ($\hat{Lm}$).

The phase calculator 2313' can calculate a phase estimate ( ) by using the inverse tangent of a low band signal ($\hat{Lm}$) as shown in Equation 7.

$$\hat{phase} = \arctan\left(\frac{\text{imaginary}(\hat{Lm})}{\text{real}(\hat{Lm})}\right) \quad \text{[Equation 7]}$$

Referring again to FIG. 18, the phase compensator 233 compensates for phase distortion by using a phase estimate ($\hat{phase}$).

Referring to FIG. 21, the phase compensator 233 includes a phase calculator 2331, a controller 2333, an adder 2335, and a controller 2337.

The phase calculator 2331 calculates the phase ($\hat{Pm}$) of an input baseband signal, and calculates a phase estimate ($\hat{phase}'$) by using the inverse tangent of the phase ($\hat{Pm}$) in the same method as in Equation 5 or 6.

The controller 2333 receives an input of a phase estimate ($\hat{phase}$) from the phase estimator 231 or 231', and multiplies it by −1 and outputs the resulting value.

The adder 2335 adds the phase estimate ($\hat{phase}$) and the output value of the controller 2333.

That is, the controller 2333 and the adder 2335 function to subtract the phase estimate ($\hat{phase}$) from the phase estimator 231 or 231' from the phase estimate ($\hat{phase}$) of the phase calculator 2331.

The controller 2337 divides a value obtained by subtracting the phase estimate ($\hat{phase}$) from the phase estimator 231 or 231' from the phase estimate ($\hat{phase}$) of the phase calculator 2331 by a gain G4, and therefore outputs a distortion-compensated phase P. Herein, the gain G4 may be identical to the gain G1 of the phase controller 161.

Figure 22:
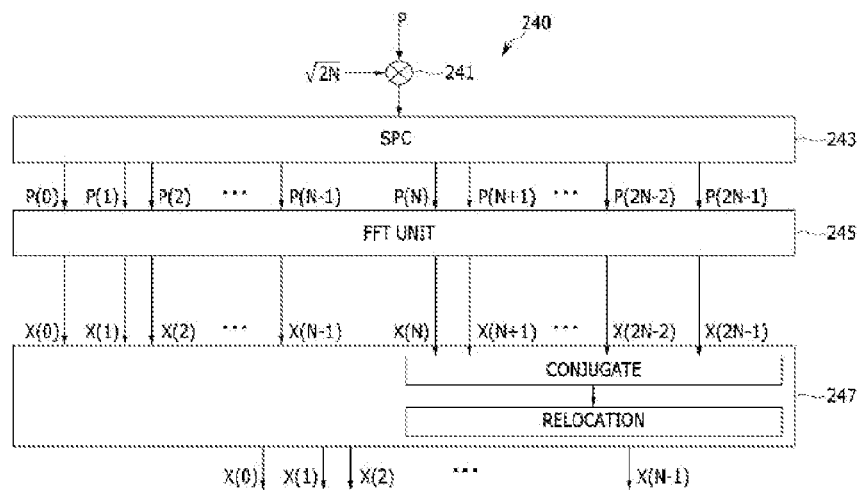
FIG. 22 is a view showing the real signal converter shown in FIG. 14.

FIG. 22 is a view showing the real signal converter shown in FIG. 14.

Referring to FIG. 22, the real signal converter 240 includes a multiplier 241, an SPC 243, an FFT unit 245, and a signal processor 247.

The multiplier 241 multiplies a real signal P output from the angle demodulation unit 230 by $1/\sqrt{2N}$ to perform normalization, and then outputs the signal to the SPC 243.

The SPC 243 converts the signal normalized by the multiplier 241 from a serial signal to a parallel signal in order to perform FFT of the normalized signal, and outputs the signal to the FFT unit 245.

When parallel signals converted by the SPC 253 are input as input signals [P(0), P(1), ..., P(N−1), P(N), P(N+1), ..., P(2N−1)] of the FFT unit 245, the FFT unit 245 performs FFT of the input signals [P(0), P(1), ..., P(N−1), P(N), P(N+1), ..., P(2N−1)]. Then, the input signals [P(0), P(1), ..., P(N−1), P(N), P(N+1), ..., P(2N−1)] are converted from the time domain to data symbols [X(0), X(1), ..., X(N−1), X(N), X(N+1), ..., X(2N−1)] in the frequency domain.

The signal processor 247 outputs signals [(X(0), X(1), ..., X(N−1)] in the frequency domain, among the data symbols [X(0), X(1), ..., X(N−1), X(N), X(N+1), ..., X(2N−1)] in the frequency domain, to the symbol demapper 260. At this point, the signal processor 247 may output the data symbols [(X(0), X(1), ..., X(N−1)] as they are to the pilot extractor 250. The signal processor 247 may perform complex conjugation on the data symbols [X(N+1), ..., X(2N−1)] in the frequency domain and then relocate the data symbols at the position of X(2N−k) and output them to the pilot extractor 250. Here, k is N+1, N+2, ..., 2N−1. For example, the signal processor 247 may perform complex conjugation on the symbol [X 2N−1] in the frequency domain on which FFT has been performed, and relocate the symbol at the position of X(1).

Figure 23:
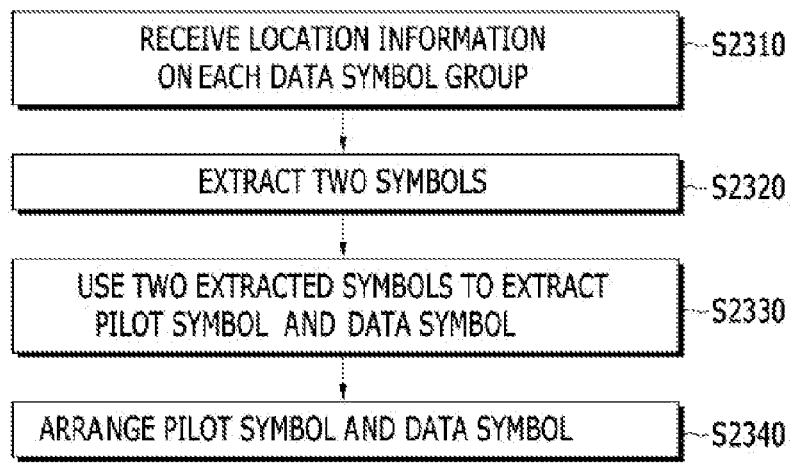
FIG. 23 is a view showing a pilot extraction method of the pilot extractor shown in FIG. 14.

FIG. 23 is a view showing a pilot extraction method of the pilot extractor shown in FIG. 14.

Referring to FIG. 23, the pilot extractor 250 acquires location information of symbols obtained by adding and subtracting a pilot symbol and a data symbol defined for each data symbol group by the OFDM transmitting apparatus 100, from a plurality of data symbols input in parallel (S2310).

The pilot extractor 250 extracts two symbols in each data symbol group from the location information on each data symbol group (S2320).

The pilot extractor 250 extracts a pilot symbol and a data symbol selected by the OFDM transmitting apparatus 100 by using the two extracted symbols (S2330).

When the OFDM transmitting apparatus 100 generates two new symbols y adding and subtracting the pilot symbol and the selected data symbol, the sum of the two acquired symbols is equal to a pilot symbol. The difference between a symbol obtained by adding the two symbols and a symbol obtained by subtracting the two symbols is equal to the data symbol selected by the OFDM transmitting apparatus 100. For example, if the pilot symbol is 1 and the data symbol selected by the OFDM transmitting apparatus 100 is 3+j*5, it is assumed that two symbols are received, one obtained by adding the pilot symbol and the data symbol is equal to $(4+j*5)\sqrt{2}$ and the other obtained by subtracting the pilot symbol and the data symbol is equal to $(-2-j*5)/\sqrt{2}$. Here, $\sqrt{2}$ is used for normalization. A value obtained by adding the two symbols and dividing the resulting value by $\sqrt{2}$ is equal to 1, and a value obtained by subtracting the two symbols and dividing the resulting value by $\sqrt{2}$ is equal to 3+j*5.

When the OFDM transmitting apparatus 100 generates two new symbols by adding and subtracting the selected data symbol and the pilot symbol, the sum of the two symbols is equal to the selected data symbol. The difference between a symbol obtained by adding the two symbols and a symbol obtained by subtracting the two symbols is equal to the pilot symbol. For example, if the data symbol selected by the OFDM transmitting apparatus 100 is 3+j*5 and the pilot symbol is 1, it is assumed that two symbols are received, one obtained by adding the pilot symbol and the selected data symbol is equal to $(4+j*5)/\sqrt{2}$ and the other obtained by subtracting the pilot symbol from the selected data symbol is equal to $(2+j*5)/\sqrt{2}$. A value obtained by adding the two symbols and dividing the resulting value by $\sqrt{2}$ is equal to 3+j*5, and a value obtained by subtracting the two symbols and dividing the resulting value by $\sqrt{2}$ is equal to 1.

The pilot extractor 250 arranges the extracted pilot symbol and data symbol at a position set in the OFDM transmitting apparatus (S2340).

Figure 24:
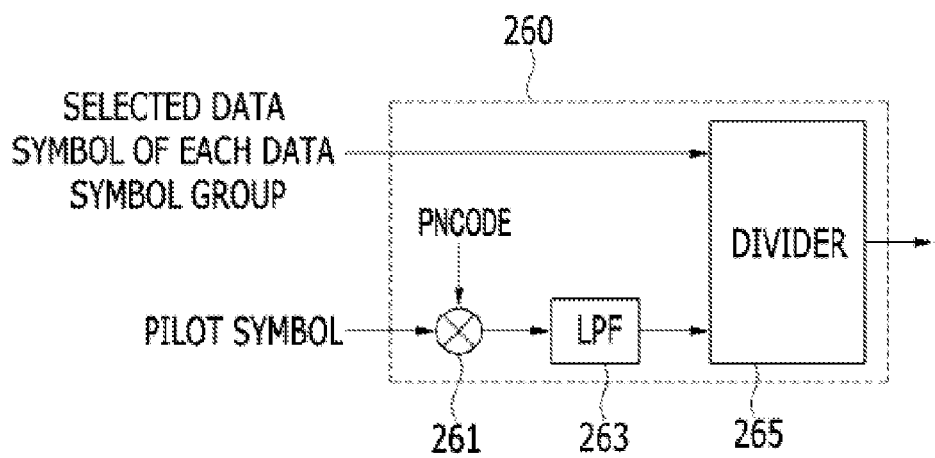
FIG. 24 is a view showing the channel estimator shown in FIG. 14.

FIG. 24 is a view showing the channel estimator shown in FIG. 14.

Referring to FIG. 24, the channel estimator includes a multiplier 261, an LPF 263, and a divider 265.

The multiplier 261 multiplies a pilot symbol extracted by the pilot extractor 250 by a PN code generated by the OFDM transmitting apparatus 100 and outputs the resulting value to the LPF 263.

The LPF 263 filters the pilot symbol multiplied by the PN code to remove noise.

The divider 265 divides data symbols of each data symbol group by a pilot symbol of the data symbol group to perform channel estimation. For example, if respective data symbol groups and pilot symbols of the data symbol groups are as shown in FIG. 7, three data symbols of the first data symbol group are divided by the first pilot symbol and seven data symbols of the second data symbol group are divided by the second pilot symbol.

The channel equalizer 270 performs channel equalization using an estimated channel to compensate for channel distortion, and the symbol demapper 280 demaps individual data symbols on a constellation according to a modulation scheme corresponding to the symbol demapper 120 to a plurality of parallel data signals, and outputs the plurality of parallel data signals to the PSC 280. Then, the PSC 280 converts the plurality of parallel data signals into a plurality of serial data signals, thereby restoring data.

The above-described exemplary embodiments of the present invention are not only implemented by methods and apparatuses, but, on the contrary, are intended to be realized by a program for realizing functions corresponding to the configuration of the exemplary embodiments of the present invention or a recording medium for recording the program. Such implementation can be easily made by a skilled person in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A data transmitting apparatus comprising:
    a pilot generator to generate at least one pilot signal to be used for channel estimation by a data receiving apparatus;
    a symbol mapper to perform symbol mapping of a plurality of data signals and at least one pilot signal into a plurality of data symbols and at least one pilot symbol;
    a real signal converter to convert input symbols in the frequency domain including the plurality of data symbols and the at least one pilot symbol into a real signal in the time domain;
    an angle modulation unit to perform angle modulation of the real signal;
    a Peak-to-Average Power Ratio (PAPR) control & power normalization unit to adjust the amplitude of the sine component of the angle-modulated real signal in accordance with a first gain, and to vary the first gain in accordance with an input signal; and
    a signal transmitter to convert the amplitude-adjusted real signal into a radio frequency signal and to transmit the radio frequency signal,
    wherein the angle modulation unit comprises:
    a phase controller to control the amplitude of the real signal in accordance with a second gain; and
    a modulator to perform angle modulation of the real signal into a cosine signal and a sine signal.

2. The apparatus of claim 1, further comprising a symbol arrangement unit that configures pilot symbols respectively corresponding to a plurality of data symbol groups each including at least one data symbol, generates two symbols by using one data symbol of each of the data symbol groups and a pilot symbol, arranges the two symbols in the data symbol group, and outputs the two symbols to the real signal converter.

3. The apparatus of claim 2, wherein the symbol arrangement unit generates one of the two symbols by adding the data symbol and the pilot symbol, and generates the other of the two symbols by subtracting the data symbol and the pilot symbol.

4. The apparatus of claim 1, wherein the real signal converter comprises:
    a normalization unit for normalizing the input symbols so that the average power of the input symbols is 1;
    an inverse fast Fourier transform unit for performing inverse fast Fourier transform on a plurality of input signals; and
    an input signal processor for inputting the input symbols and complex conjugates of the input symbols into the inverse fast Fourier transform unit.

5. The apparatus of claim 4, wherein the input signal processor
    arranges N data symbols at positions of 0th to (N−1)th input signals if the number of input symbols is N, and arranges a plurality of complex conjugate symbols at positions of Nth to (2N−1)th input signals, and
    the complex conjugate symbols of the (2N−k)th input signal are arranged at positions of (N+1)th to (2N−1)th input signals,
    wherein N is a positive integer, and k is a value ranging from N+1 to 2N−1.

6. The apparatus of claim 1, wherein the PAPR control & power normalization unit comprises:
    a PAPR controller for controlling the size of the sine component of the angle-modulated real signal in accordance with the first gain;
    a first multiplier for multiplying the cosine component of the real signal by a set value for normalization and generating a baseband Inphase (I) signal; and
    a second multiplier for multiplying the sine component of the real signal whose amplitude is controlled in accordance with the first gain by the set value and generating a baseband Quadrature phase (Q) signal,
    wherein if the first gain is 1, the PAPR is 0.

7. A data receiving apparatus comprising:
    a power compensator to compensate for an adjustment in the amplitude of a baseband signal corresponding to reception data, the adjustment being made by the data receiving apparatus to achieve Peak-to-Average Power Ratio control;
    an angle demodulation unit to perform angle demodulation of the baseband signal of which amplitude has been compensated for;
    a normalization and real signal de-converter to convert the angle demodulated signal from the time domain into a plurality of parallel symbols in the frequency domain by fast Fourier transform;
    a pilot extractor to extract a pilot symbol and data symbols from the parallel symbols;
    a channel estimator to perform channel estimation by using the pilot symbols;
    a channel equalizer to perform channel compensation by using an estimated channel; and
    a symbol demapper to perform symbol demapping of the data symbols into a plurality of data signals, whereby restoring data,
    wherein the angle demodulation unit comprises:
    a phase estimator to calculate a phase estimate of the baseband signal; and
    a phase compensator to compensate for the phase of the baseband signal from the phase estimate.

8. The apparatus of claim 7, wherein the phase estimator obtains the average of the phase of the baseband signal and calculate the phase estimate by the inverse tangent of the average.

9. The apparatus of claim 7, wherein the phase estimator filters the baseband signal and calculates the phase estimate by the inverse tangent.

10. The apparatus of claim 7, wherein the pilot extractor acquires location information of two symbols generated using a pilot symbol by the data receiving apparatus from the parallel symbols, and extracts a pilot symbol and a data symbol by using the two symbols corresponding to the location information.

11. The apparatus of claim 7, wherein the power compensator comprises:

two multipliers to compensate for the amplitudes of the Inphase (I) and Quadrature (Q) signals of the baseband signal, respectively; and a PAPR controller to divide the Q signal whose amplitude has been compensated for by a gain and to output the resulting value, wherein the gain is varied.

12. The apparatus of claim 7, wherein the normalization and real signal de-converter comprises:
a Fast Fourier phase transform unit for performing fast Fourier transform on a plurality of input signals into parallel symbols;
a serial-to-parallel converter for converting the angle-demodulated baseband signals from serial signals to parallel signals; and
a signal processor for outputting part of the parallel symbols to the demapper.

13. A data transmitting method of a data transmitting apparatus, the method comprising:
generating a plurality of pilot signals to be used for channel estimation by a data transmitting apparatus;
performing symbol mapping of a plurality of input signals and the plurality of pilot signals to generate a plurality of data symbols and a plurality of pilot symbols;
converting input symbols in the frequency domain including the plurality of data symbols and the plurality of pilot symbols from the frequency domain into a real signal in the time domain;
performing angle modulation of the real signal;
controlling the amplitude of the sine component of the angle-modulated real signal; and
converting the angle-modulated real signal into a radio frequency signal and transmitting the radio frequency signal,
wherein the performing of angle modulation comprises:
controlling the amplitude of the real signal in accordance with a second gain; and
performing angle modulation of the real signal into a cosine signal and a sine signal.

14. The method of claim 13, wherein the generating of a plurality of pilot signals comprises:
configuring pilot symbols respectively corresponding to a plurality of data symbol groups each including at least one data symbol;
generating two symbols by using one data symbol of each of the data symbol groups and a pilot symbol; and
arranging the two symbols in the data symbol group.

15. The method of claim 13, wherein the controlling comprises varying the gain in accordance with an input control signal.

16. A data receiving method of a data receiving apparatus, the method comprising:
compensating for the amplitude of a baseband signal corresponding to reception data to achieve Peak-to-Average Power Ratio control;
performing angle demodulation of the baseband signal of which amplitude has been compensated for;
converting the angle demodulated signal from the time domain into a plurality of parallel symbols in the frequency domain by fast Fourier transform;
extracting a pilot symbol and data symbols from the parallel symbols;
performing channel estimation by using the pilot symbol;
performing channel compensation using an estimated channel; and
performing symbol demapping of the data symbols to restore the reception data,
wherein the performing angle demodulation comprises:
calculating a phase estimate of the baseband signal; and
compensating for the phase of the baseband signal by using the phase estimate.

17. The method of claim 16, wherein the extracting comprises:
acquiring location information of two symbols generated using a pilot symbol by the data transmitting apparatus; and
extracting a pilot symbol and data symbols by using the two symbols corresponding to the location information.

* * * * *